(12) United States Patent
Erwin et al.

(10) Patent No.: US 6,886,664 B2
(45) Date of Patent: May 3, 2005

(54) AUTOMOTIVE FLUID EXCHANGE SYSTEM

(75) Inventors: Harold E. Erwin, Augusta, KS (US); Abram B. Kuipers, Derby, KS (US)

(73) Assignee: BG Products, Inc., Wichita, KS (US)

( * ) Notice: Subject to any disclaimer, the term of this patent is extended or adjusted under 35 U.S.C. 154(b) by 174 days.

(21) Appl. No.: 10/366,939

(22) Filed: Feb. 14, 2003

(65) Prior Publication Data

US 2004/0159495 A1 Aug. 19, 2004

(51) Int. Cl.⁷ .......................... F16N 27/02; F16N 33/00
(52) U.S. Cl. ..................... 184/1.5; 184/7.4; 184/103.1; 137/625.19
(58) Field of Search .................. 184/1.5, 7.4, 103.1; 137/625.19, 595; 141/98

(56) References Cited

U.S. PATENT DOCUMENTS

| | | | | |
|---|---|---|---|---|
| 4,128,140 A | * | 12/1978 | Riches ..................... | 184/1.5 |
| 4,869,346 A | * | 9/1989 | Nelson ..................... | 184/1.5 |
| 5,415,247 A | | 5/1995 | Knorr ........................ | 184/1.5 |
| 5,507,309 A | * | 4/1996 | Dean ....................... | 137/87.03 |
| 5,535,849 A | * | 7/1996 | Few ......................... | 184/1.5 |
| 5,806,629 A | * | 9/1998 | Dixon et al. ............... | 184/1.5 |
| 5,887,847 A | * | 3/1999 | Holborow .................. | 251/33 |
| 6,105,635 A | * | 8/2000 | Viken ....................... | 141/98 |
| 6,170,505 B1 | | 1/2001 | Erwin ....................... | 137/1 |
| 6,244,384 B1 | * | 6/2001 | Few ......................... | 184/1.5 |

* cited by examiner

*Primary Examiner*—Chong H. Kim
(74) *Attorney, Agent, or Firm*—Shook, Hardy & Bacon L.L.P.

(57) ABSTRACT

Disclosed is an apparatus and process for exchanging an engine fluid for maintenance purposes. The fluid is accessed through the engines reservoir for that particular fluid. Used fluid is removed simultaneously with the introduction of new fluid. In order to maintain a constant level of fluid in the reservoir, and thus, prevent overflow or cavitation problems, a control module is presented that enables the user to control the rate of new fluid flow into the reservoir relative to the rate of used fluid and to activate and deactivate the new and used fluid pumps. During operation, the module is located in close proximity to the reservoir such that the user is able to observe the fluid level while relating the flows.

14 Claims, 6 Drawing Sheets

US 6,886,664 B2

AUTOMOTIVE FLUID EXCHANGE SYSTEM

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

The present invention relates to an improved method and apparatus for simultaneously exchanging various automotive fluids. More specifically, the present invention discloses a method and apparatus for exchanging the power steering fluid of a vehicle using a particular device. The device includes a control module which enables the user to control the flow rate of new fluid into the power steering reservoir relative to the flow rate of old fluid being removed. The module further enables the user to set a lever at a particular setting once the flow rates are controlled such that the fluid level within the reservoir will remain constant.

2. Description of the Related Art

The typical automobile has numerous fluid systems. These fluids, in order for the vehicle to be properly maintained, must be changed out periodically. This means simply removing the old (or "dirty") fluid and replacing it with clean new fluid. This is true with respect to motor oil, transmission fluid, differential fluid, and power steering fluid.

With respect to power steering fluid, special problems are encountered. The power steering fluid is used as part of the steering hydraulic system of the vehicle. The hydraulic system consists of a pump, hoses and lines to transport the fluid, cylinders and pistons to create motion, and gear drives or turbines to turn shafts. Numerous valves are also used to control the flow and activate the systems. These valves are often small and very sensitive to debris or any form of solid contaminants. The amount of power steering fluid present in the system in an automobile is actually very small. It usually amounts to one quart or less. This small amount of fluid has traditionally been difficult to replace. This is because there is no easy way to drain and refill the system. In fact, most vehicles systems have no built-in way to be drained or refilled.

One reason access to the power steering system is made limited, is that upon draining and refilling of the fluid, air is often trapped within the system. Trapped air in a system can damage components and diminish system performance. Many methods have been used in the prior art to change out steering fluid. One such method involves simply removing the pump return line from the vehicle's system. This allows the pump to dispense the old fluid into a separate container which is placed beneath the vehicle. The new fluid is either sucked into or poured into the reservoir. This method is possible on only a few power steering system designs where the lines are accessible and removable. However, even in the rare instances that using this method is possible, there is an ever-present danger that air will get trapped within the system. Additionally, disconnecting these lines and then reconnecting them can result in leaks. Because of the small amount of fluid in the system to begin with, even small leaks can cause the system pump to cavitate and thus be destroyed.

A second method that is known in the prior art that, unlike the first method, does not disturb the plumbing of the power steering system (does not involve the removal of lines), is shown in FIG. 9. Referring to FIG. 9, the prior art device 210 has both fresh fluid and used fluid conduits referenced at 256 and 262 respectively. The system also uses first and second pumps, 216 and 218, through which conduits 256 and 262 extend. Pumps 216 and 218 are not variable, and are switched on and off using switches. Conduit 262 is used to withdraw old fluid from reservoir 258 and dump it into a container 274. New fluid conduit 256 draws new fluid out of container 248 and then distributes it into the reservoir 258. Upon closer inspection, it can be seen that conduit 256 distributes fluid into the reservoir 258 at a level above that which dirty fluid is withdrawn from the reservoir in conduit 262.

The details regarding this prior art system may be seen in U.S. Pat. No. 5,415,247 issued to Knorr ("Knorr"). Though a significant achievement over earlier power steering fluid exchange systems, Knorr still presented problems when used in the field. One of these problems involved its inability to cope with the differences in circulation rates of different power steering fluid systems. Because the Knorr pumping system does not allow the user to adjust the flow rates of each individual conduit, the user was required to maintain a particular fluid level in the reservoir by manipulating the on and off switches of pumps 216 and 218. This made the procedure labor intensive. This is because the user would have to keep an eye on the level in the reservoir, which contained very little fluid to begin with, to make sure that (i) the fluid would not overflow, and (ii) the reservoir would not run dry. Overflow of the reservoir would create a mess, whereas were the reservoir to run dry, air would be introduced into the system and possibly cause damage thereto.

Sometimes, two technicians would be needed. This is because one user alone could not monitor the level of fluid in the reservoir at the same time as having access to the pump on/off switches. The relative remoteness of pump controls for pumps 216 and 218 from the reservoir would create this problem. Thus, constant attention by the user or users was required. Therefore, there was a need for a way to control the flow rates in conduits 256 and 262 so that they would remain at a rate relative to one another that would cause the level in the reservoir 258 to remain at a constant and not to overflow or run dry. Further, there was a need in the art for a control module that would enable the user to be able to monitor the level of fluid in the reservoir simultaneously with being able to adjust the relative flow rates of the conduits but also to be able to turn the pumps off and on with one controller.

SUMMARY OF THE INVENTION

It is one object at the present invention to provide a method and apparatus capable of enabling the user of a fluid exchange system for a vehicle to control the flow rate of the conduit used to suction old fluid from a reservoir relative to the flow of new fluid coming into the reservoir in a second conduit.

It is another object of the present invention to provide a control module that enables the user to control these relative flow rates and also to activate and deactivate the pumps while working in close proximity with the opening of the reservoir so that the level of fluid within the reservoir may be observed.

It is a further object of the present invention to provide a housing for the disclosed system which enables containers of cleaner and new fluid to be conveniently held and fluidly tapped into the reservoir within the vehicle in which fluids are to be replaced.

BRIEF DESCRIPTION OF THE DRAWINGS

The present invention is described in detail below with reference to the attached drawing figures, wherein.

DETAILED DESCRIPTION OF THE INVENTION

The present invention provides a fluid exchange system which solves the problems present in the prior art systems. This is accomplished by providing a method and apparatus capable of providing a controller that is capable of maintaining the flow rate within the fresh fluid delivery conduit at an appropriate level relative to the flow rate of old fluid being removed from the vehicle in a second conduit. Also disclosed is a control module which enables the user to, in addition to controlling the relative flow rates, to turn the pumps on and off—all of these operations being executable while the user remains in close proximity to the reservoir which contains the particular fluid being serviced so that the level of fluid within the reservoir may be observed.

Figure 1:
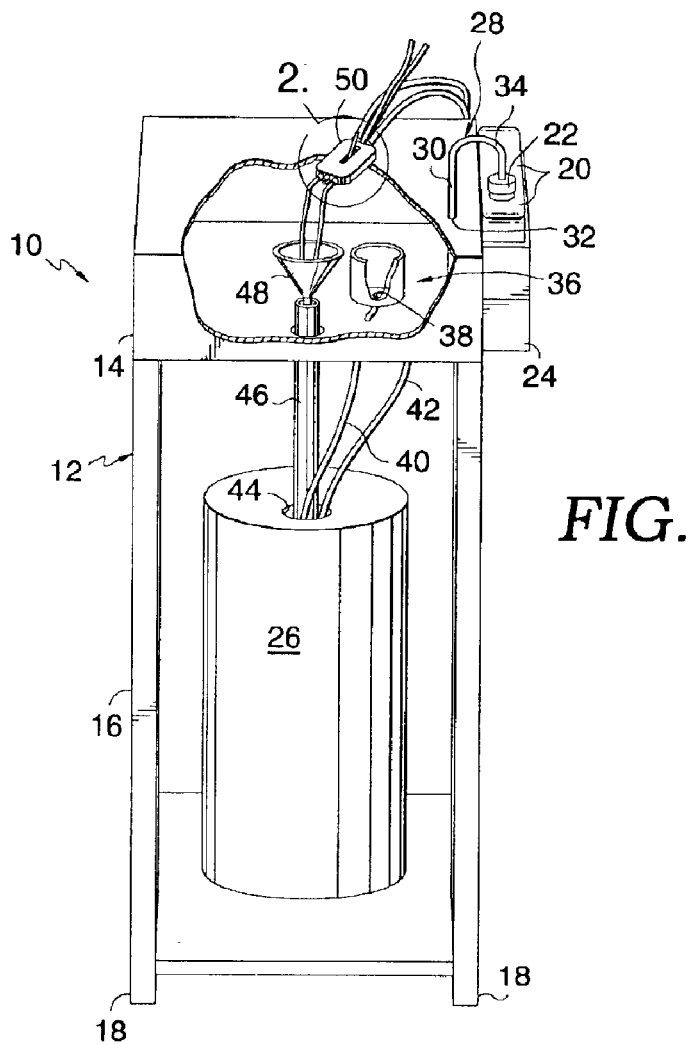
FIG. 1 is a front view of the apparatus of the present invention with a removed section showing the funnel and cleaner-holder devices.

The specifics regarding the invention are disclosed in FIGS. 1 through 8. Referring first to FIG. 1, disclosed is a fluid exchange apparatus 10 which is contained within a housing 12. Housing 12 has an upper portion 14 and a lower portion 16. Housing 12 also has a plurality of legs 18 which serve to support it. A pouch 24 on the right-hand side of the upper portion of the housing 14 is used to hold a container of new fluid 20 which has a cap 22. This is the source of new fluid that will be used to change out the old fluid within the vehicle. The old fluid removed from the vehicle will be distributed to a used fluid container 26 which is contained within the lower portion of the housing 16.

Snorkel-shaped metal conduit 28 is used to tap into new fluid container 20 through cap 22 or, alternatively may be used to tap into a container or cleaner in cleaner receiving cylinder 36 or into a receiving hole 38 when the apparatus is in disposal mode and it is desirable to empty used container 26 into some other container. When in disposal mode, an insertion end 34 of the snorkel 28 is placed within receiving hole 38 so that fluid communication may be had with disposal conduit 40 in that dirty fluid may be drawn up out of container 26 in a manner to be described later. Snorkel 28 has a slide portion 30 which slides in and out of the cabinet enabling the insertion end to be lifted up and down and swiveled between the new fluid container 20 and either a cleaner bottle (not pictured) within cylinder 38 or when cleaner container is removed from cylinder directly into receiving hole 38 for disposal purposes. Slide portion 30 of snorkel 28 is contained within a hole bore at a bore hole 32 on the upper portion of housing 14. A used fluid conduit 42 is used to dump old dirty fluid from the vehicle in container 26. Conduits 40 and 42 are both received in a circular opening 44 at the top of container 26 so that they may fill or empty the container 26. Also within circular opening 44 is a drip pipe 46 which has placed within its upper opening a drip funnel 48. Drip funnel 48 and pipe 46 are used to catch excess fluid when control module 50 is not in use and is rested in funnel 48. As will be described later, control module 50 is used to control the disbursement of new fluid and the withdrawal of old fluid from the vehicle. When module 50 is not in use, it is helpful to place its lead conduits 56 and 58 in funnel 48 (as shown in FIG. 1) so that no mess is created.

Figure 2:
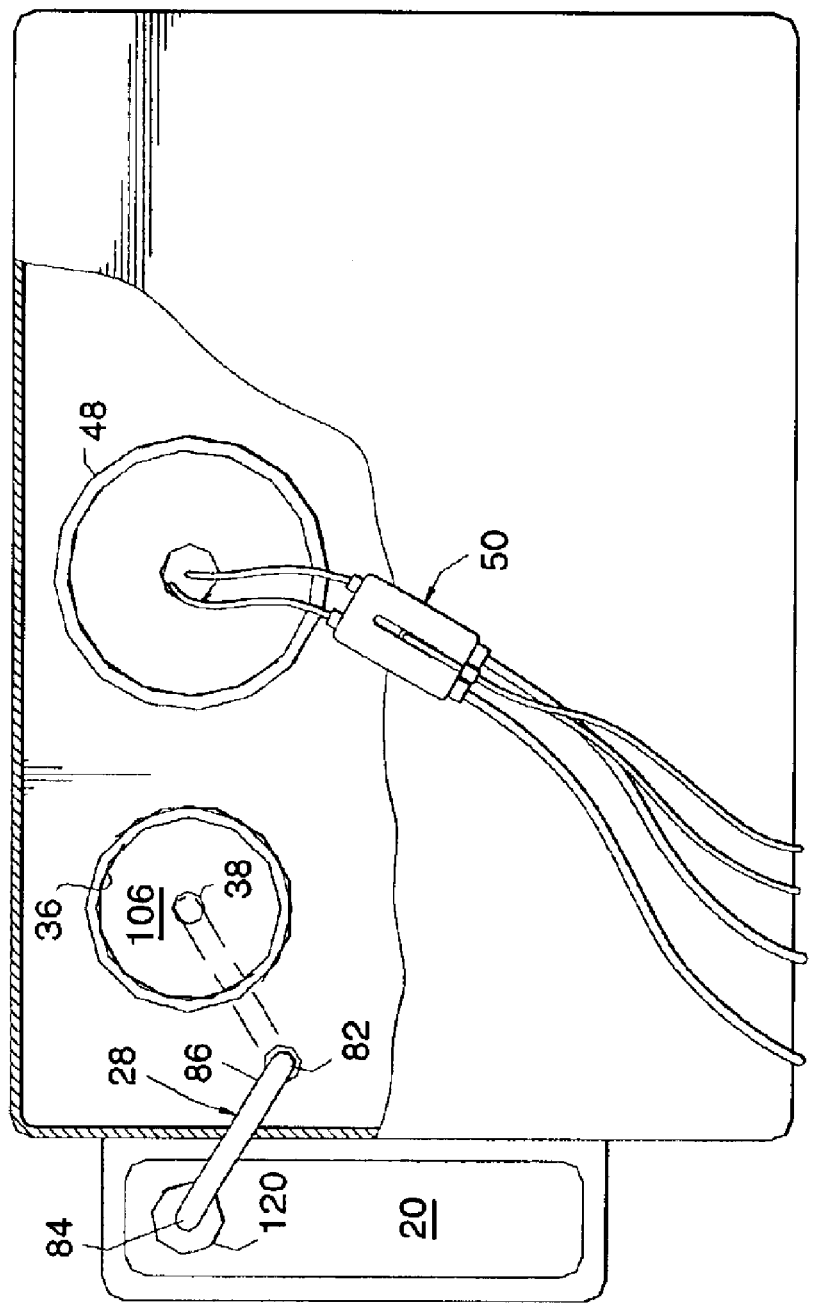
FIG. 2 is a bird's eye view of the housing of the present invention showing the function of the fluid-transmitting snorkel of the present invention.

FIG. 2 shows the fluid exchange apparatus 10 from above. From this view, the possible orientations of snorkel 28 may be seen in even greater detail. As shown in the figure, the short stem 110 of snorkel 28 is located within the opening 120 in the new fluid container 20 at position 110a. An alternative position 110b of snorkel 28 is shown in broken lines. When in this position, short stem 110 would be placed within receiving hole 38 during the disposal mode of the apparatus 10. During the cleaning mode of the present invention (as will be discussed later), the short stem 110 will be placed within a container of cleaner (not pictured) so that cleaner may be administered to the vehicle. The bottom of cylinder 36 is visible in FIG. 2, since no container of cleaner is shown to be disposed therein. The inner diameter of cleaner receiving cylinder 36 is designed to receive the typical commercially available sized container. Also seen in FIG. 2, funnel 48 is shown receiving wands 56 and 58 attached to control module 50. Fluids are known to leak from wands 56 and 58 when module 50 is not in use. Thus, to prevent making a mess, the user may place module 50 and wands 56 and 58 in the funnel between services.

The details regarding the control module 50 are shown in FIGS. 3 through 7.

Figure 3:
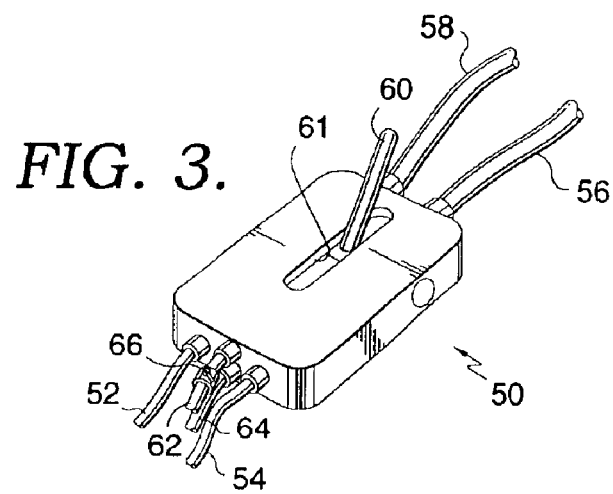
FIGS. 3 through 7 show the details of the control module of the present invention.

Referring first to FIG. 3, control module 50 comprises a used fluid suction conduit 52 and a new fluid delivery conduit 54. With respect to the functions of these conduits (52 and 54), it is helpful to refer to the schematic shown in FIG. 8. Viewing FIG. 8 along with FIG. 3, it may be seen that used fluid suction conduit 52 is connected to a used fluid pump 92 to withdraw dirty-used fluid from the reservoir. In order to accomplish this, used fluid suction line 52 is connected with a transparent plastic wand 56. Wand 56, is inserted into the reservoir along with wand 58 which is slightly shorter in length than wand 56. Wand 56 is shorter than wand 58 so that the withdrawal point of used fluid is sufficiently displaced from the introduction point of the new fluid. This prevents the withdrawal of unacceptable percentages of new fluid along with the used fluid so that the process may be more efficient. Wand 58 is connected with a new fluid delivery line 54 and is used to introduce new fluid into the reservoir. The flow rate of new fluid into the reservoir through conduit 54 (and thus wand 58) relative to the flow rate through conduit 52 (and thus wand 56) regulated by a lever 60. Lever 60 is received in a longitudinal slot 61 within the housing 51 of control module 50.

Also shown in FIG. 3 is the air control valve 66, which is a simple ball valve. Such ball valves are well known in the art, and variably control the flow of air by the rotation of a ball on a spindle. The ball has a hole in its center which permits (or stops) the flow of air depending on its position. Depending on the position of valve 66, the pumps may be activated, deactivated, sped up, or slowed. Valve 66 is physically present on air delivery line 62. Shown immediately below delivery line 62 is an air return line 64. Return line 64 is used to return the pressurized air from the module to the system 90.

In operation, air delivery line 62, when open, allows air from an air supply 88 (see FIG. 8) into module 50 after which the air is returned out of the module by way of air return line 64. Air return line 64 is what is used to power both pumps (see FIG. 8) 92 and 94. Thus, whether these pumps operate or not may be controlled completely by either opening or closing air control valve 66.

Figure 4:
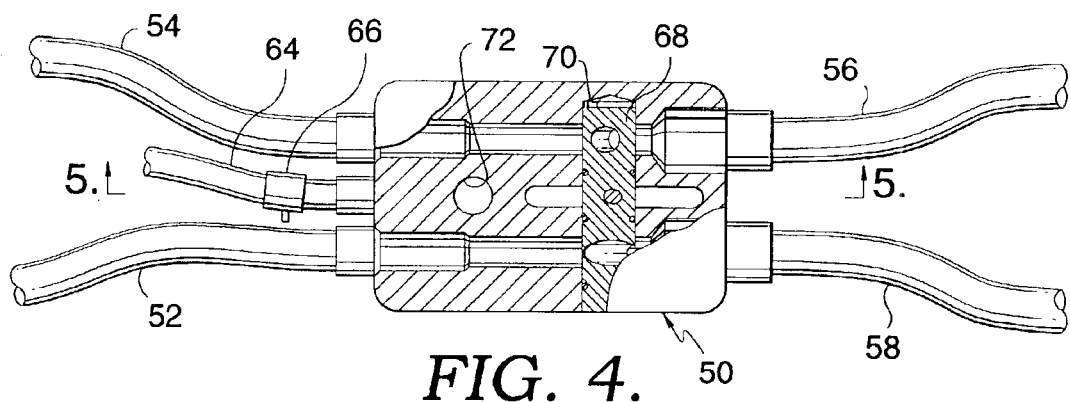

FIG. 4 is a view from below control module 50 with a broken out section designed to expose the innermost features of the module. Therein revealed are the flow paths (i) between from new fluid conduit 54 and new fluid wand 58, and (ii) between used fluid conduit 52 and used fluid wand 56. As can be seen from the figure, the new fluid travels from new fluid conduit 54 into a new fluid receiving port 81. From port 81, the new fluid travels through an internal conduit 89 up to a hole 84 in a rotational member 68. After passing through hole 84, the new fluid passes into a reciprocating section 93 of internal conduit 89. Section 93 opens up into a new fluid exit port 83. Thus, new fluid flows into wand 58 to be introduced to the reservoir in the vehicle (not pictured).

Fluid being removed from the vehicle is drawn up into wand 56. From there, the used fluid travels into a used fluid in-port 85. After in-port 85, the used fluid flows through a reciprocating section 95 of a used fluid internal conduit 91. From the reciprocating section 95, the used fluid passes through a hole 82 in rotational member 68. Once through hole 82, the used fluid passes through the remaining portion of internal conduit 91, then out used-fluid exit port 87 into the used fluid conduit 52. Conduit 52 runs to the used fluid pump 92, which delivers the suction necessary to withdraw the used fluid.

Figure 5:
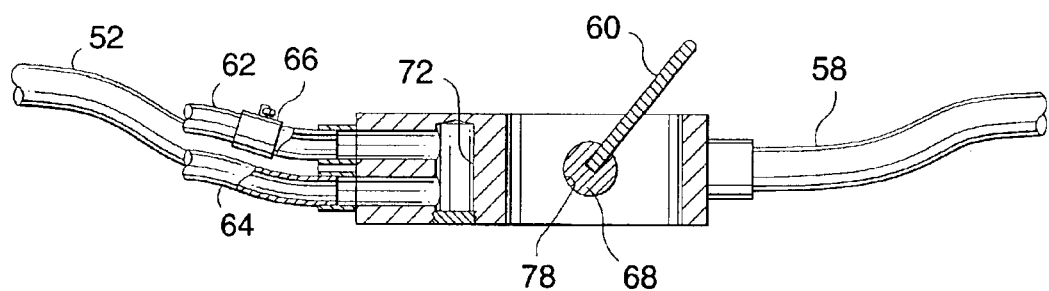

FIG. 5 reveals the internal details of the pump speed control features of control module 50 already discussed with respect to FIG. 3 above. A partial bore 72 drilled through module housing 51 is part of this system, as will be described hereinafter. Bore 72 does not pass all the way through housing 51. Instead, bore 72 stops short of the upper part of module housing 51. Also shown in FIG. 5 is a screw plug 73. Screw plug 73 is used to cap off partial bore 72 to maintain an air tight system between an air delivery line 62 and an air delivery line 64. When valve 66 is open, air in delivery line 62 introduces pressurized air through air introduction port 77 down through partial bore 72 (which is capped by screw plug 73) and then out air exit port 75, then through air return line 64. Line 64 is used to drive both pumps 92 and 94 (see FIG. 8). When valve 66 is closed, however, the pumps are stopped.

Figure 6:
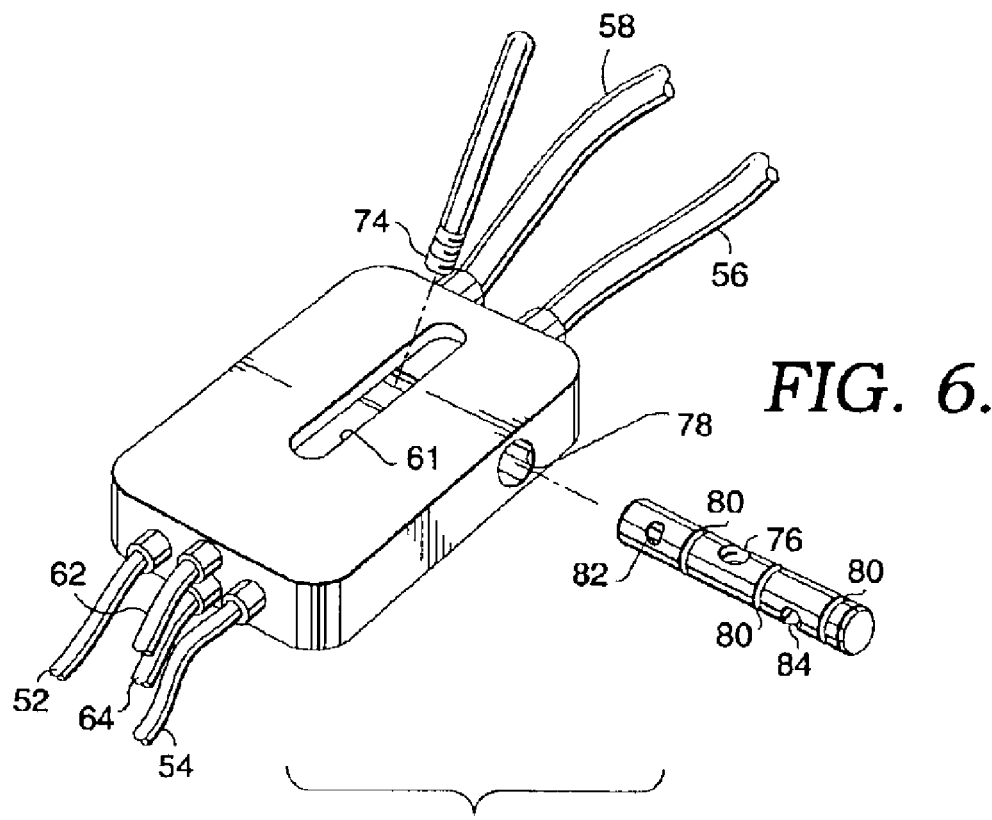

As can be seen in FIGS. 5 and 6, member 68 is received into module 50 through a bore hole 78, which is bored into the module housing 51 transversely. Referring back to FIG. 4, member 68 can be seen to have a pointed end 70. It can also be seen from FIG. 4 that bore hole 78 does not go all the way through module 50, but stops short so that member 68 may be maintained within the module when a lever 60 is attached to the member 68. The longitudinal slot 61 along with lever 60 will maintain the member 68 within the module once lever 60 is installed.

FIG. 6 shows the details of how member 68 is installed. As can be seen from the figure, member 68 is slid into bore hole 78 until it reaches the full extent of the bore within module 50. Before being inserted, three O-rings are placed on member 68 into three respective O-ring receiving channels 80. These O-rings will be used to prevent fluid communication between the new and used fluid systems within the module 50 and also between the fluids within the module and the outside of the module. Once member 68 is within the module 50, the lever 60 is screwed into the member 68 using a number of threads 74 on lever 60. These threads 74 are screwed into reciprocating threads 76 on member 68. This causes member 68 to be held within the module and rotatable with respect to the motion of lever 60. Lever, when acted upon, is allowed to run up and down the length of longitudinal slot 61. The rotational movement of lever 60, however, is limited at its forward-most and rearward-most extent by a pair of ends, 63 and 65 respectively, in slot 61. This, thus, consonantly limits the extent of rotational movement possible by member 68 within bore 78.

Figure 7:
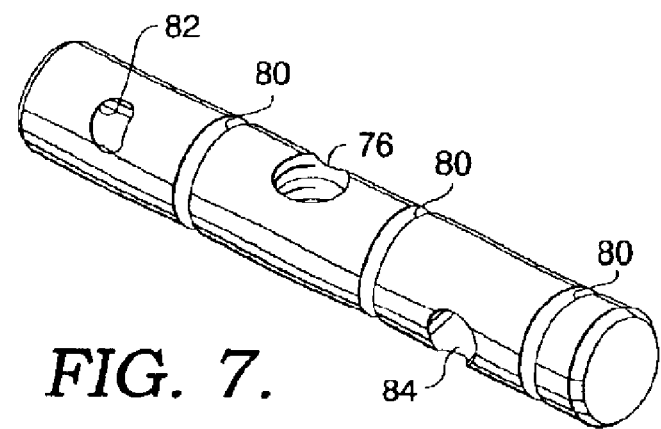

Referring now to FIG. 7, a used fluid flow rate mechanism 82 and a new fluid flow rate mechanism 84 may both be seen. Mechanisms 82 and 84 are simply holes bored through member 68. These holes 82 and 84, are used to control the flow rate of used fluid being removed from the vehicle relative to the flow rate of new fluid being distributed to the vehicle in response to rotation of member 68 by activating lever 60. More specifically, holes 82 and 84 are bored through the center axis of member 68. Assuming that lever 60 is at mid position, sticking straight up vertically, the center axis of hole 82 is bored down through member 68 at an angle of 15 degrees to horizontal (or 75 degrees from lever 60 when lever 60 is fixed to member 68) when viewed in a cross-sectional plane of the member. The bore axis of hole 82 is perpendicular to and intersects the longitudinal axis of member 68.

Hole 84 is also bored perpendicular to and intersects the longitudinal axis of member 68. However, when viewed in a cross-sectional plane, the center axis of hole 84 inclines upward at a 15 degree angle (assuming again that lever 60 on member 68 were sticking straight up vertically). This means that hole 84 is at a 105 degree angle to lever 60 (assuming lever 60 is fixed to member 68). This also means that the center axis of hole 82 will be at an angle of 30 degrees to the center axis of hole 84 when the two bores are viewed relative to a cross-sectional plane.

These bore angles enable the module 50 to control the flow rate of new fluid through internal conduit 89 relative to the flow rate of used fluid through internal conduit 91. This is because as lever 60 is moved in a forward direction (towards the wands), the used fluid internal conduit 91 will become more and more occluded whilst internal conduit 89 (through which the new fluid flows) will become less and less occluded. This means that the further forward lever 60 is moved, the rate of introduction of new fluid into the reservoir will be increased relative to the rate of removal of used fluid from the reservoir.

The backward movement of lever 60 (towards air lines 52 and 54), however, has the opposite effect. When the lever is backed-out, internal conduit 91 (used fluid) will become less and less occluded and internal conduit 89 (new fluid) will become more and more occluded. This increases the rate of removal of used fluid relative to the rate of introduction of new fluid.

Figure 8:
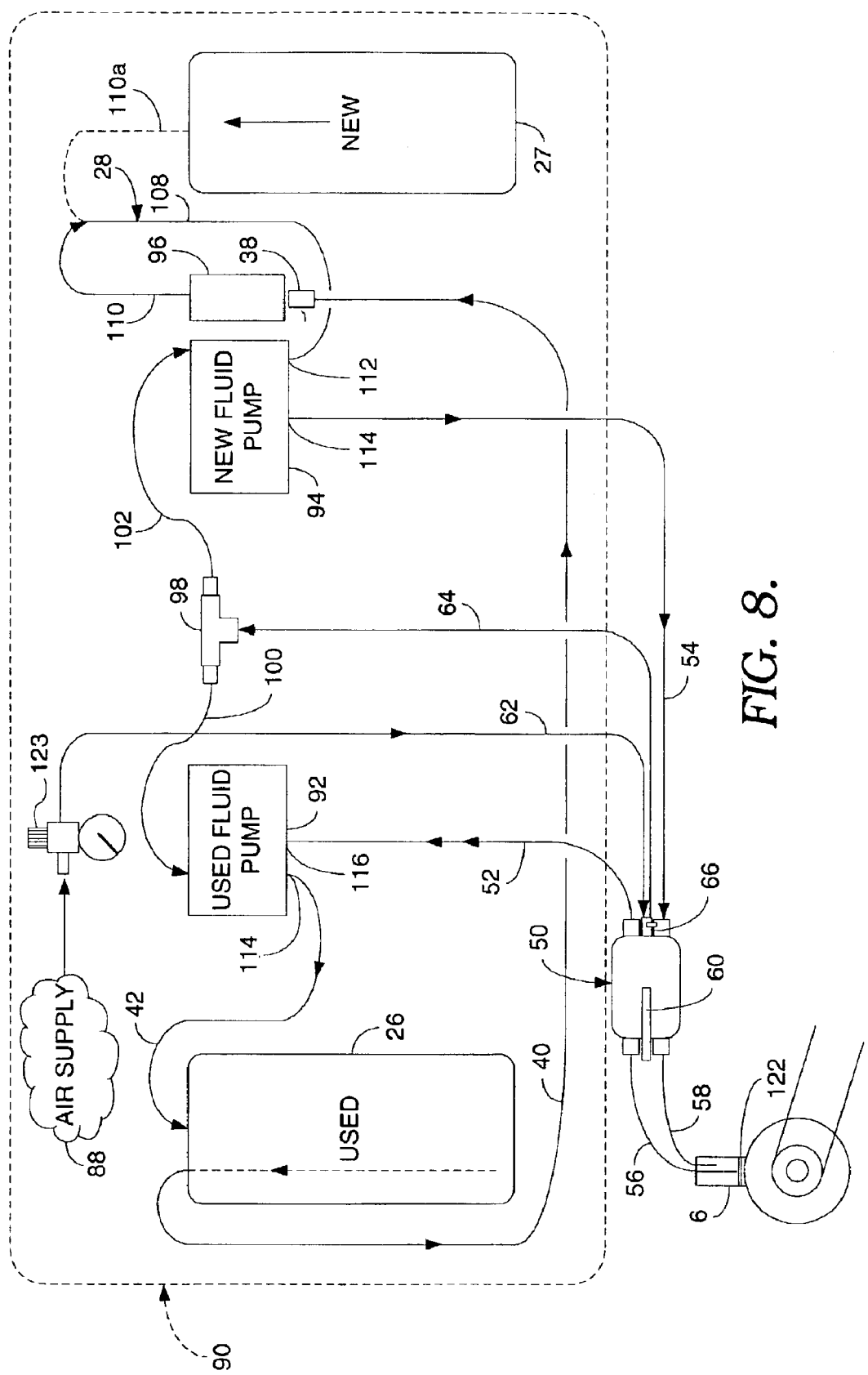
FIG. 8 shows a schematic of the fluid control system of the present invention.
Figure 9:
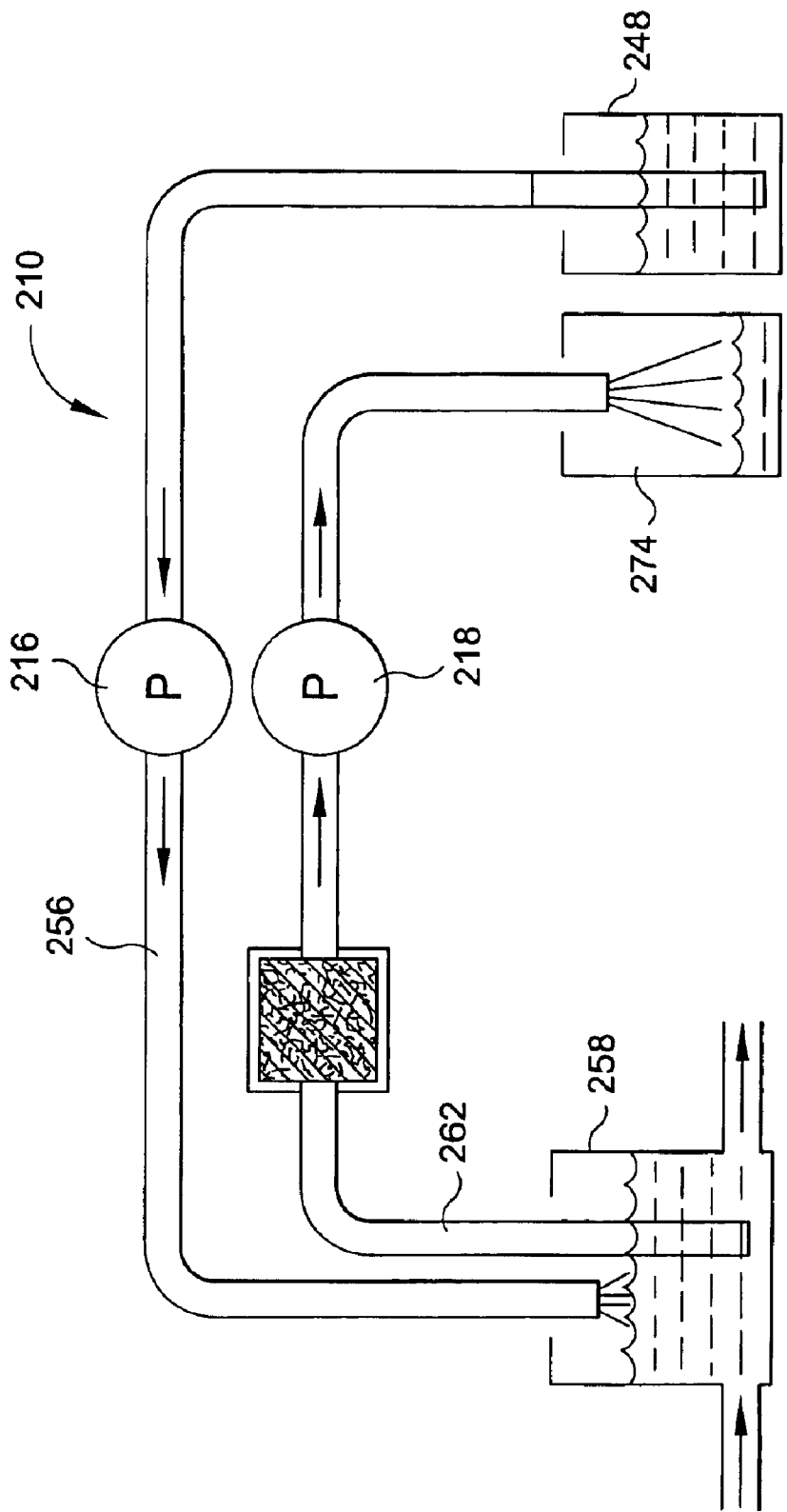
FIG. 9 discloses the Knorr prior art system.

FIG. 8 shows a schematic representation of the fluid controls of the present invention. The fluid control system 90 comprises the two pumps, used fluid pump 92 and new fluid pump 94. Pumps 92 and 94 are air powered using a pressurized air source 88. From the air source 88, air travels under pressure through a regulator 123 which may be used to regulate the flow of air into the system. Thus, because the pumps used in this system are powered by air source 88, regulator 123 may be used to increase or decrease pump speed (as will be hereinafter described).

Once through regulator 123, the pressurized air travels through air delivery line 62 until it reaches air control valve 66. When valve 66 is open, air will be transmitted through in-port 77 (See FIG. 5), to partial bore 72, then out control module 50 through out-port 75. Thereafter, the air is returned to system 90 by way of air return line 64. Line 64 transmits the air to T-splitter 98. T-splitter 98 divides the delivered air in two directions. Some of the air is directed through air line 100 in order to power the used fluid pump 92. The rest of the pressurized air will travel through air line 102 to power new fluid pump 94. Because of this arrangement, valve 66 on module 50 is able to control both pumps simultaneously. If valve 66 is open, both pumps 92 and 94 will be activated. If valve 66 is closed, pumps 92 and 94 will be inactive.

It should also be recognized that because valve 66 is a ball valve, it can be partially open to a desired setting. This enables the user to regulate the amount of pressurized air allowed through the valve—and thus, control the speed of the pumps in much the same way as is possible using regulator 123. When pumps 92 and 94 are activated in response to valve 66 being opened, both used and new fluid will move throughout the system 90. The flow rates of these fluids may be controlled in response to the particular setting of ball valve 66, or by a particular setting of regulator 123. From a practical standpoint, it may be advantageous to use valve 66 to control pump speed because it is conveniently located on the control module 50. Use of the regulator 123, however, will usually be preferred because regulators are more accurate. In some cases, both devices may be used to set a speed.

New fluid pump 94 may be used to (i) deliver cleaning solution from container 96 into the fluid reservoir on the vehicle, (ii) deliver new fluid from container 27 to the reservoir during the exchange mode, or (iii) withdraw used fluid from used fluid container 26 through conduit 58 in order to dispose of the old fluid.

With respect to these three modes of operation, the particular mode is chosen by selecting the appropriate placement of snorkel 28. During cleaning mode, the snorkel will be lifted and then placed within the container of cleaner 96. This snorkel position is shown in solid lines in FIG. 8. The short end of the snorkel is shown at 110. During exchange mode, when new fluid will be introduced to the vehicle, the short end of the snorkel is placed in the position shown in solid lines in FIG. 2. FIG. 2 also shows the particular position of short end of at 110a within new fluid container 27. When the system is in disposal mode, any container in cylinder 36 must first be removed. Then short end 110 of snorkel 28 will be placed within the receiving hole 38 in cylinder 36 (as shown in broken lines in FIG. 2) to suction used fluid from container 26 through disposal conduit 40.

Regardless of the mode of operation, the short stem 110 of snorkel 28 is always used to suction fluid the particular location in which it is placed. Once the fluid is suctioned through short stem 110 and passes through long stem 108, it is drawn into an in-port 112 of new fluid pump 94. Pump 94 will then dispels the fluid from an out port 114 of pump 94 along new fluid delivery line 54 into control module 50. The fluid then exits the module 50 in wand 58. When in cleaning or exchange modes, wand 58 is placed within, and thus, will introduce the fluid into reservoir 6. However, when in disposal mode, 58 is directed into a drain (not shown) or separate container (also not shown) used to dispose of old dirty fluids.

During either cleaning or exchange modes, used fluid pump 92 is used to draw old fluid or used fluid from reservoir 6 in wand 56. This fluid then travels through module 50, then through used fluid suction line 52 into in port 116 on used fluid pump 92. The used fluid pump 92 then directs the used fluid out through the out port 114 of pump 92 through used fluid conduit 42 into used fluid container 26 to be held until it is ready to be disposed of. During disposal mode, however, fluid is drawn out of container 26 via disposal conduit 40 directed to the receiving hole 58 of cylinder 36 through snorkel 28, back through new fluid 94, then through conduit 54, out through module 50, then out through wand 58. Wand 58, however, during disposal mode, is placed within a disposal drain or disposal container (neither of which are pictured).

The operating instructions with respect to each of the three modes will now be discussed in more detail.

Cleaning Mode

The first mode of operation is employed in order to expose the vehicle's fluid control system to a chemical cleaner which is delivered to the vehicle using the present invention. First, a container of cleaner (not shown) should be procured and placed in cylinder 36. Next, air source 88 should be hooked up and pressurized air delivered to the system. Before hooking up air source 88, the user should make sure valve 66 is in closed position to prevent premature activation of pumps 92 and 94. Then, short stem 110 should be placed within container 96 of cleaner as shown in FIG. 8. This will enable the cleaner to be drawn into the system by new fluid pump 94. System 90 is now prepared.

Now that the system is prepared, the user should remove the cap on the power steering fluid reservoir 6 of the vehicle. Once the cap (not pictured) is removed, the user should obtain module 50 and insert wands 56 and 58 into reservoir 6 as shown in FIG. 8. Wand 56, being longer than wand 58, will be lowered into the reservoir 6 until it reaches a screen 122 at the bottom thereof. Shorter wand 58 will not go in as deep as the other wand.

Once these wands 56 and 58 are positioned correctly in reservoir 6, valve 66 is opened and pressurized air activates pumps 92 and 94. Pumps 92 and 94 then begin the delivery of fluid. The flow rates of both pumps will be responsive to the extent to which valve 66 is opened. However, regulator 123 may also be used to control these flow rates. Fluid is then drawn out of container 96 by new fluid pump 94 and administered through control module 50 and wand 58 into reservoir 6. Simultaneously, old dirty fluid is drawn out by wand 56 into used fluid pump 92 and then delivered to used fluid container 26.

Initially, lever 60 should be sticking straight up (perpendicular to longitudinal slot 61). If the level in the reservoir begins to rise, lever 60 should be pushed forward in the direction towards wands 56 and 58. However, if the level of fluid within reservoir 6 begins to fall, the stick should be pulled back from center in the direction away from wands 56 and 58. The user should be able to find a setting of lever 60 in which the level of fluid within the reservoir remains constant, and then leave the lever at this setting. At this point, the user is able to direct him or herself to other tasks which may require their attention. This is because there is not the worry (as with the prior art methods) of reservoir overflow or pump cavitation. The user should pay careful attention, however, to make sure that container of cleaner 96 does not run dry. Once container 96 runs out of fluid, pumps 92 and 94 should be turned off by completely closing valve 66. This stops the air pressure delivered.

Now that the contents of can 96 have been administered to the vehicle, wand 50 should be removed and placed in drip funnel 48. The vehicle should then be run for 15 minutes to allow the cleaner time to work loose contaminants within the system. Several times during the running of the engine, the steering wheel should be turned from stop to stop to open all of the steering system's components to the cleaner. Next, it is time to exchange new fresh fluid for the dirty chemically treated fluid in the vehicle.

Exchange Mode

During the transition from cleaning mode to exchange mode, the engine should remain running. The steering wheel should be tied off approximately one inch from stop. Alternatively, the user could turn the wheel stop to stop three or four times during the exchange process. Either alternative will help to open up all components to the flush action to enable thorough cleaning. Short stem 110 of snorkel 28, having been lifted up and out of container of cleaner 96, should then be rotated and dropped into the opening of new fluid container 20. A special cap 22 may be designed for new fluid container 20 so as to allow short stem 34 to be easily inserted into new fluid container 20 while maintaining a substantially air-tight environment within container 20. Once the snorkel 28 is in position within container 20, control module 50 should be lifted out of drip funnel 48 and inserted back into reservoir 6. Lever 60 should be sticking straight up.

The pumps should then be activated by opening valve 66. This causes new fluid to be drawn from container 27 through snorkel 28, into new fluid pump 94, then through new fluid delivery line 54, then into reservoir 6. Simultaneously, old fluid will be drawn through wand 56 through module 50, then through used fluid suction line 52 into used fluid pump 92 and then delivered to used fluid container 26 by way of used fluid conduit 42. During this process, the user should observe carefully the fluid level within reservoir 6 (just as was done during the cleaning mode). If the level in the reservoir begins to rise, lever 60 should be pushed forward towards the wands 56 and 58. If the level of fluid within the reservoir 6 recedes, lever 60 should be pulled back away from wands 56 and 58. Lever 60 should be adjusted until the level within reservoir 6 is maintained at a constant. At such a time, the user may be able to engage another task without having to continuously watch the level of fluid in reservoir 6. This is because there is no longer any fear of cavitation or overflow.

The user should be careful to observe that the exchange rate of fluids from system 90 into reservoir 6 is not faster than the natural exchange rate of the vehicle. If the two do not appear to be in sync, the user may adjust a regulator 123 that is part of air supply 88 to accordingly increase or decrease the speed of the pumps. Pump speeds could alternatively be controlled by adjustment of valve 66, or the speeds could be controlled using combined settings for valve 66 and regulator 123. The preferred method of controlling pump (and thus fluid flow) depends on the circumstances. More accuracy and consistency is possible with adjustment of regulator 123. Valve 66, however, may be more practical in some situations because the user is able to watch the fluid activity in the reservoir during adjustment.

Air valve 66 should be completely closed off just before new fluid container 20 runs dry. This enables the user to "top off" the system as necessary once the process is completed. The wands should then be removed along with control module 50 and placed back in drip funnel 48. Module 50 and wands 56 and 58 may be placed in and stored in funnel 48 until the next service. Several services may be performed before old fluid container 26 becomes full. Once old fluid container 26 becomes full, it may be drained as described below.

Disposal Mode

In order to drain old fluid container 26, wand 58 (but not wand 56) should be placed within the drain or container intended to be filled with the used fluid for disposal purposes. When used fluid container 26 becomes full, the system of the present invention also allows the user to automatically dump its contents into a disposal drain or another container. This is done by connecting short stem 110 of snorkel 28 lifting it and placing it in receiving hole 38 (See position indicated in broken lines in FIG. 2). Once snorkel 28 is so positioned, old used fluid will be drawn out of container 26 through disposal conduit 40 through receiving hole 38 into snorkel 28, through new fluid pump 94, then through delivery line 54, then module 50 and then wand 58. The dirty fluid is then expelled from wand 58 into a disposal drain or container. This should be continued until used container 26 is empty and ready to be re-used for several services thereafter.

What is claimed is:

1. An apparatus for exchanging the fluid from a reservoir in a fluid system comprising:

a delivery conduit for delivering fluid to the reservoir at a delivery flow rate;

a removal conduit for removing fluid from the reservoir at a removal flow rate;

a controller having a member being rotatable in first and second directions of rotation;

said member, when rotated in said first direction increases said delivery flow rate while simultaneously decreasing said removal flow rate; and, said member, when the rotated in said second direction decreases said delivery flow rate while simultaneously increasing said removal flow rate.

2. The apparatus of claim 1 wherein said member further comprises:

a delivery flow regulating mechanism in fluid communications with said delivery conduit;

said delivery flow regulating mechanism decreasingly occluding said delivery conduit when said member is rotated in said first direction and increasingly occluding said delivery conduit when said member is rotated in said second direction; and a removal flow regulating mechanism in fluid communications with said removal conduit;

said removal flow regulating mechanism increasingly occluding said removal conduit when said member is rotated in said first direction and decreasingly occluding said removal conduit when said member is rotated in said second direction.

3. The apparatus of claim 2 wherein said member is elongated with a substantially circular cross-section and said delivery and removal flow regulating mechanisms are holes bored through said member cross-axially at two different longitudinal locations, said holes bored at about 30 degrees one to the other when viewed relative to a cross-sectional plane.

4. The apparatus of claim 3 wherein said member is received within a member receiving bore partially drilled through a housing which is adapted to receive said conduits, said member receiving bore intersecting with said conduits, said holes through said member being longitudinally located such that they fluidly communicate with said conduits when said member is inserted into said member receiving bore.

5. The apparatus of claim 4, further comprising a lever transversely extending from said member, said lever being received within a longitudinal slot, said slot having a pair of ends which define the maximum rotation of said member within said member receiving bore, and a pair of sides which engage said lever and prevent said member from sliding out of said member receiving bore.

6. The apparatus of claim 1 wherein said member may be fixed at a plurality of settings to accommodate the different flow characteristics of different fluid systems and to maintain a particular level of fluid within said reservoir.

7. The apparatus of claim 1 wherein said controller further comprises a delivery wand for dispensing new fluid in said reservoir and a removal wand for removing old fluid from said reservoir, said member being rotatable by a user when said wands are in said reservoir and a level of fluid within said reservoir is observable by said user.

8. The apparatus of claim 1 wherein said controller also comprises switch which activates both the delivery and removal of fluid from the reservoir when in an "on" position, or deactivates both the delivery and removal of fluid from the reservoir when in an "off" position.

9. The apparatus of claim 8 wherein said switch is in "on" position, pressurized air activates at least one pump which when activated, causes the delivery and removal of fluid, and when said switch is in "off" position, the source of pressurized air is shut off from said at least one pump.

10. The apparatus of claim 9 wherein said switch is an air valve.

11. The apparatus of claim 10 wherein said air valve is a ball valve.

12. The apparatus of claim 9 wherein said "on" position of said switch comprises a plurality of sub-settings which enable the at least one pump to be operated at a plurality of speeds.

13. An apparatus for exchanging the fluid from a reservoir in a fluid system comprising:
  means for delivering fluid to the reservoir at a delivery flow rate;
  means for removing fluid from the reservoir at a removal flow rate;
  means for a controlling said delivery and removal flow rates relative to one another so that a level of fluid within said reservoir may be maintained at a constant, wherein said controlling means comprises: an adjustment device which increases said delivery flow rate while decreasing said removal flow rate when rotated in a first direction and decreases said delivery flow rate while increasing said removal flow rate when rotated in a second direction.

14. The apparatus of claim 13 wherein said adjustment device is located such that it may be adjusted by a user at the same time as said user is observing said level of fluid within the reservoir.

* * * * *